(12) United States Patent
Clifton et al.

(10) Patent No.: US 6,388,648 B1
(45) Date of Patent: May 14, 2002

(54) COLOR GAMUT AND LUMINANCE MATCHING TECHNIQUES FOR IMAGE DISPLAY SYSTEMS

(75) Inventors: Benjamin R. Clifton, Oregon City; Paul E. Gulick, Tualatin; John P. Fogarty, Oregon City; Greg A. Sorenson, Tigard, all of OR (US)

(73) Assignee: Clarity Visual Systems, Inc., Wilsonville, OR (US)

( * ) Notice: Subject to any disclaimer, the term of this patent is extended or adjusted under 35 U.S.C. 154(b) by 0 days.

(21) Appl. No.: 09/391,551

(22) Filed: Sep. 8, 1999

Related U.S. Application Data (63) Continuation-in-part of application No. 08/740,966, filed on Nov. 5, 1996.
(60) Provisional application No. 60/133,167, filed on May 7, 1999.

(51) Int. Cl.$^7$ ................................................. G09G 3/36
(52) U.S. Cl. ........................... 345/88; 345/89; 345/199; 345/149
(58) Field of Search .......................... 345/88, 147, 149, 345/1, 90, 89, 199

(56) References Cited

U.S. PATENT DOCUMENTS

| | | | |
|---|---|---|---|
| 4,379,292 A | 4/1983 | Minato et al. | 340/701 |
| 4,409,614 A | 10/1983 | Eichler et al. | 358/76 |

(List continued on next page.)

FOREIGN PATENT DOCUMENTS

| | | | | |
|---|---|---|---|---|
| EP | 0595649 | 5/1994 | .......... | H04N/17/04 |
| WO | 9115931 | 10/1991 | .......... | H04N/17/02 |

OTHER PUBLICATIONS

"Correcting Method for Gradation of Projection Type Liquid Crystal Display and Correcting Device for Gradation", Kuzumoto Keiichi, Patent Abstracts of Japan, Pub. No. 07056545, Mar. 3, 1995.

(List continued on next page.)

*Primary Examiner*—Richard Hjerpe
*Assistant Examiner*—Ali Zamani
(74) *Attorney, Agent, or Firm*—Stoel Rives LLP (57) ABSTRACT

An LCD projection unit employs a luminance and color balance system employing an LCD array characterization lookup table storing multiple sets of luminance and gamma correction values that are user selectable to control luminance and color balance. The lookup table values are determined by measuring the transfer function of the LCD array in the projection unit for each of a set of red ("R"), green ("G"), and blue ("B") input data values, converting the resulting S-curve responses to corresponding sets of gamma responses and scaling the gamma responses to generate multiple R, G, and B families of luminance and gamma corrected values. Color balance is adjusted by selecting the particular R, G, and B families of luminance and gamma corrected values that cause the LCD projection unit to match a predetermined ratio of R, G, and B luminance values. Luminance is adjusted by selecting sets of families of R, G, and B, luminance values that maintain the color balance ratio while causing the LCD to transmit the desired overall luminance.

The primary colors are adjusted by a method of color mixing implemented by a mathematical matrix algorithm that generates color modification coefficients for a color space conversion circuit. The primary color matching algorithm involves measuring the intrinsic colors coordinates of the primaries, determining a set of predetermined target coordinates, and performing matrix operations to calculate the coefficients used in the color space conversion circuit to convert the measured to the target coordinates, thereby matching the primary colors. When the primary color are matched, the above-described color balance and luminance matching system adjusts the white and gray balance to result in a well-matched multiscreen display system.

15 Claims, 10 Drawing Sheets

U.S. PATENT DOCUMENTS

| | | | |
|---|---|---|---|
| 4,500,919 A | | 2/1985 | Schreiber .................... 358/78 |
| 4,875,032 A | | 10/1989 | Mcmanus et al. .......... 340/703 |
| 5,315,378 A | | 5/1994 | Satou et al. ................ 348/655 |
| 6,043,797 A | * | 3/2000 | Clifton et al. ................ 345/1 |
| 6,188,454 B1 | * | 2/2001 | Greene et al. ............... 345/88 |

OTHER PUBLICATIONS

"LCD Rear Projector with Improved Picture Quality for HDTV", Yokozawa et al., May 17, 1992, Society for Information Display, SID 92 Digest, pp. 281–284.

* cited by examiner

$$Rr := \left[ \frac{((Xg \cdot Zb \cdot SYr) - (Xg \cdot TZr \cdot Yb) - (Xb \cdot TYr \cdot Zg) - (TXr \cdot Zb \cdot Yg) + (YXr \cdot Zg \cdot Yb) + (Xb \cdot Yg \cdot TZr))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12A $$Gr := \left[ \frac{((Zb \cdot Yr \cdot TXr) - (Zb \cdot TYr \cdot Xr) + (TZr \cdot Xr \cdot Yb) + (Zr \cdot Xb \cdot TYr) - (TZr \cdot Xb \cdot Yr) - (Zr \cdot TXr \cdot Yb))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12B $$Br := \left[ \frac{((Xg \cdot TZr \cdot Yr) - (Xr \cdot Yg \cdot TZr) - (Xg \cdot Zr \cdot TYr) + (TXr \cdot Yg \cdot Zr) - (TXr \cdot Zg \cdot Yr) - (Zg \cdot Xr \cdot TYr))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12C $$Rg := \left[ \frac{((Xg \cdot Zb \cdot TYg) - (Xg \cdot TZg \cdot Yb) - (Xb \cdot TYg \cdot Zg) - (TXg \cdot Zb \cdot Yg) + (TXg \cdot Zg \cdot Yb) + (Xb \cdot Yg \cdot TZg))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12D $$Gg := \left[ \frac{((Zb \cdot Tr \cdot TXg) - (Zb \cdot TYg \cdot Xr) + (TZg \cdot Xr \cdot Yb) + (Zr \cdot Xb \cdot TYg) - (TZg \cdot Xb \cdot Yr) - (Zr \cdot TXg \cdot Yb))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12E $$Bg := \left[ \frac{((Xg \cdot TZg \cdot Yr) - (Xr \cdot Yg \cdot TZg) - (Xg \cdot Zr \cdot TYg) + (TXg \cdot Yg \cdot Zr) - (TXg \cdot Zg \cdot Yr) + (Zg \cdot Xr \cdot TYg))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12F $$Rb := \left[ \frac{((Xg \cdot Zb \cdot TYb) - (Xg \cdot TZb \cdot Yb) - (Xb \cdot TYb \cdot Zg) - (TXb \cdot Zb \cdot Yg) + (TXb \cdot Zg \cdot Yb) + (Xb \cdot Yg \cdot TZb))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12G $$Gb := \left[ \frac{((Zb \cdot Yr \cdot TXb) - (Zb \cdot TYb \cdot Xr) + (TZb \cdot Xr \cdot Yb) + (Zr \cdot Xb \cdot TYb) - (TZb \cdot Xb \cdot Yr) - (Zr \cdot TXb \cdot Yb))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

FIG. 12H $$Bb := \left[ \frac{((Xg \cdot TZb \cdot Yr) - (Xr \cdot Yg \cdot TZb) - (Xg \cdot Zr \cdot TYb) + (TXb \cdot Yg \cdot Zr) - (TXb \cdot Zg \cdot Yr) + (Zg \cdot Xr \cdot TYb))}{((-Xg \cdot Zb \cdot Yr) + (Xg \cdot Yb \cdot Zr) + (Xb \cdot Zg \cdot Yr) + (Xr \cdot Zb \cdot Yg) - (Xr \cdot Yb \cdot Zg) - (Xb \cdot Zr \cdot Yg))} \right]$$

COLOR GAMUT AND LUMINANCE MATCHING TECHNIQUES FOR IMAGE DISPLAY SYSTEMS

RELATED APPLICATIONS

This application is a continuation-in-part of copending U.S. patent application Ser. No. 08/740,966, filed Nov. 5, 1996 and claims priority from U.S. Provisional Application No. 60/133,167, filed May 7, 1999.

TECHNICAL FIELD

This invention relates to video display devices and more particularly to a color and luminance control system for projection displays that facilitates their use in multiscreen applications.

BACKGROUND OF THE INVENTION

There are previously known apparatus and methods for employing arrays of cathode-ray tube ("CRT") displays in "video walls" and signage applications. Multiscreen displays employ an abutted array of substantially identical display devices that each display a subdivided portion of a total image such that together they display the total image. Because multiscreen displays require that each of the display devices be perceived as part of a single large display device, it is important to make the boundaries between adjacent display devices appear as inconspicuous as possible.

Unfortunately, the human eye is very sensitive to boundary discontinuities, making a "seamless" multiscreen display very difficult to produce. This is especially true for arrays of CRT displays because of their nonrectangular shapes, curved face plates, and nondisplayable borders. Of course, it is also important to electronically subdivide the video so that each display seamlessly displays only its portion of the total image.

Never the less, prior workers have successfully overcome many of these problems by employing arrays of projection CRT displays coupled to intelligent video display controllers. An exemplary multiscreen display system employs an array of PROCUBE AC CRT projection displays coupled to a PICBLOC 3 display controller, both of which are manufactured by Electrosonic Systems, Inc. of Minneapolis, Minn.

Moreover, there is also a need for luminance uniformity and color balance among the displays in an array because the human eye also easily perceives luminance and color differences between adjacent displays. Therefore, the above-described system employs a manually operated luminance and color balancing system and an optional external image sensor with which the luminance and color of each CRT projection display may be manually set to match a predetermined factory standard.

Indeed, even color and luminance shading variations in an individual display can degrade the total image displayed on a multiscreen display. For example, U.S. Pat. No. 5,396,257, issued May 7, 1995, for MULTISCREEN DISPLAY APPARATUS describes a CRT-based color and luminance sampling and correction system that corrects for shading differences in each display. The system employs an intelligent controller to coordinate luminance and color samples from each display and store correction data in lookup tables that are associated with each display, but which also account for the color and luminance of the overall multiscreen display.

Figure 1A:
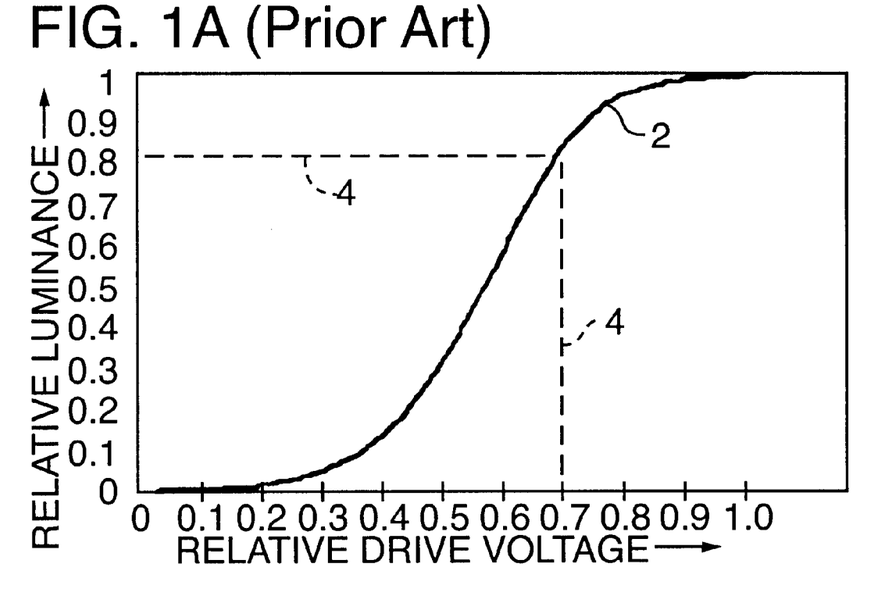
FIGS. 1A and 1B are graphical representations of prior art LCD S-curve responses resulting from different relative drive voltage levels.
Figure 1B:
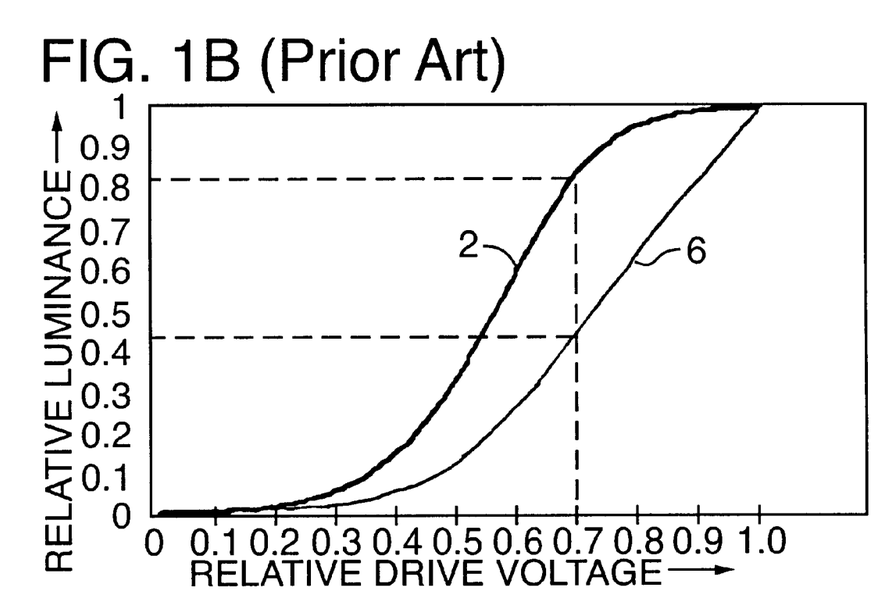

Despite this prior work, CRT-based multiscreen displays still have image stability, weight, form factor, and image matching problems. Clearly, a digitally addressed, compact, light weight display would solve many of these problems. Liquid crystal projection displays have evolved to a point where many of the above problems can be solved. For example, "A 750-TV-Line-Resolution Projector Using 1.5-Megapixel a-Si TFT LC Modules," Takeuchi et al., Society for Information Display, SID 91 DIGEST, pp. 415–418, describes such a display. Unfortunately, liquid crystal displays have not been readily accepted for use in multiscreen display applications because they have projection lamp-induced luminance variations and liquid crystal display transfer function variations that make color balancing difficult. Referring to FIG. 1A, a typical transfer function of a liquid crystal display ("LCD") is an S-curve shaped response 2 that produces a relative LCD luminance that is nonlinear with respect to its relative drive voltage. Assume that the "gain" of the LCD is reduced to 80 percent of its maximum value by attenuating its maximum drive voltage. Its reduced gain response is the portion of S-curve shaped response 2 that is bounded by dashed lines 4, and is clearly not an S-curve. The portion of S-curve shaped response 2 bounded by dashed lines 4 is shown in FIG. 1B as reduced gain response 6, and is overlaid therein with S-curve shaped response 2. Now, if two LCDs each having S-curve shaped response 2 are employed in a color LCD, and one of them is operating at the reduced gain to achieve a predetermined color balance, the overall response of the color LCD is as shown in FIG. 1B. One LCD operates with S-curve shaped response 2, and the other operates with reduced gain response 6. Comparing the two responses shows that a 1.0 relative drive voltage produces maximum output from each LCD (remember that the reduced gain LCD provides only 0.8 the relative luminance of the other LCD). Of course, at 0.0 relative drive voltage, both LCDs produce zero relative luminance. However, at an intermediate 0.7 relative drive voltage, the LCD with response 2 provides 0.82 relative luminance, whereas the LCD with reduced gain response 6 provides only 0.44 relative luminance. Indeed, most intermediate values of drive voltage will produce unbalanced amounts of relative luminance. In a color LCD having two or more LCDs, this unbalance causes unacceptable color shifts as the relative drive voltage changes. Moreover, neither S-curve response 2 nor gain corrected response 6 matches the well-known gamma curve response employed by conventional video signal sources to match the nonlinear luminance response of the human eye.

What is needed, therefore, is a color balance and luminance correction apparatus and method for liquid crystal projection displays that renders them suitable for use in color and/or multiscreen display applications.

SUMMARY OF THE INVENTION

An object of this invention is, therefore, to provide an apparatus and a method that corrects the luminance and color balance of a liquid crystal projection display.

Another object of this invention is to provide an apparatus and a method that renders uniform the luminance, color, and color balance of liquid crystal projection displays used in a multiscreen display.

A further object of this invention is to provide an apparatus and a method for adjusting the luminance, color, and color balance of a liquid crystal projection display.

An LCD projection unit of this invention employs a luminance and color balance system employing an LCD array characterization lookup table storing multiple sets of luminance and gamma correction values that are user selectable to control luminance and color balance. The lookup table values are determined by measuring the transmitted luminance of the LCD array in the projection unit for each of a set of red ("R"), green ("G"), and blue ("B") input data values, converting the resulting S-curve responses to a corresponding set of gamma responses and scaling the gamma responses to generate multiple R, G, and B families of luminance and gamma corrected values. Color balance is adjusted by selecting the particular R, G, and B families of luminance and gamma corrected values that cause the LCD projection unit to match a predetermined ratio of R, G, and B luminance values. Luminance is adjusted by selecting sets of families of R, G, and B, luminance values that maintain the color balance ratio while causing the LCD to transmit the desired overall luminance. The LCD projection unit has a readily adjustable luminance that does not interact with the color balance, thereby rendering it suitable for use in a multiscreen display system.

Color gamut correction systems of this invention are combined with the above-described luminance and color balancing system to match primary colors in addition to white and luminance values. The combined systems provide suitable color matching for any image, and solves a fundamental problem in multiscreen display systems, not just those having nonlinear transfer function characteristics. The primary colors are adjusted by a method of color mixing implemented by processing a mathematical matrix algorithm that generates color modification coefficients that are conveyed to a color space conversion circuit. For example, mixing a small amount of G into the R turns the R slightly greenish, or mixing a small amount of B into the R turns the R bluish.

The primary color matching algorithm involves measuring the intrinsic colors coordinates of the primaries, determining a set of predetermined target coordinates, and performing matrix operations to calculate the set of coefficients that are used in the color space conversion circuit to convert the measured to the target coordinates, thereby matching the primary colors. The target coordinates lie within the gamuts of all the projection units and, therefore, represent a slight tradeoff between color saturation and primary color matching. When the primary color are matched, the above-described color balance and luminance matching technique is employed to adjust the white and gray balance to result in a well-matched multiscreen display system.

Additional objects and advantages of this invention will be apparent from the following detailed description of preferred embodiments thereof that proceed with reference to the accompanying drawings.

BRIEF DESCRIPTION OF THE DRAWINGS

FIGS. 12A–12I are equations employed to determine color space coefficient values of this invention.

DETAILED DESCRIPTION OF PREFERRED EMBODIMENTS

Figure 2:
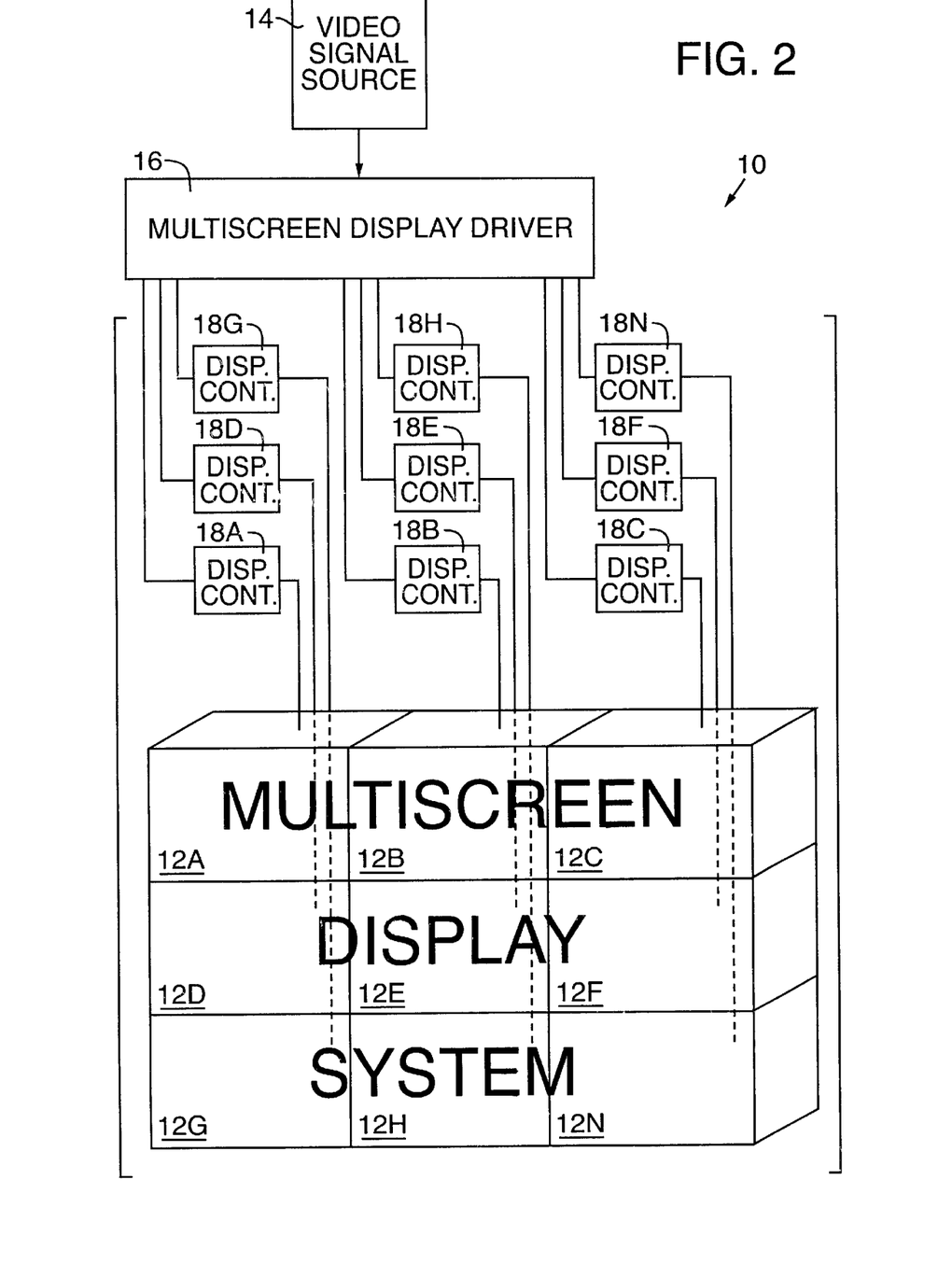
FIG. 2 is a simplified pictorial block diagram of a representative multiscreen display system suitable for use with this invention.

FIG. 2 shows an exemplary multiscreen display system 10 employing a three-by-three array of LCD projection units 12A, 12B, . . . to 12N (collectively LCD projection units 12). Of course, N may be as small as two and as big as practical to form a very large array of LCD projection units. Of course, this invention may also be employed in stand-alone LCD units. A conventional video signal source 14 drives a conventional multiscreen display driver 16, such as the PICBLOC 3 unit described in the background section of this application. Each of LCD projection units 12 are interconnected with multiscreen display driver 16 by associated display controllers 18A, 18B, . . . , to 18N, which perform LCD projection unit luminance and color balance functions as described below with reference to FIGS. 4–10. Display controllers 18 are preferably integrated within projection units 12. Multiscreen display system 10 seamlessly displays a total image having a substantially uniform luminance and color balance.

As mentioned above, LCD projection displays have not been readily accepted for use in multiscreen display applications because they have lamp assembly-induced luminance and color variations and LCD optical path nonlinearities that make color balancing difficult.

Figure 3:
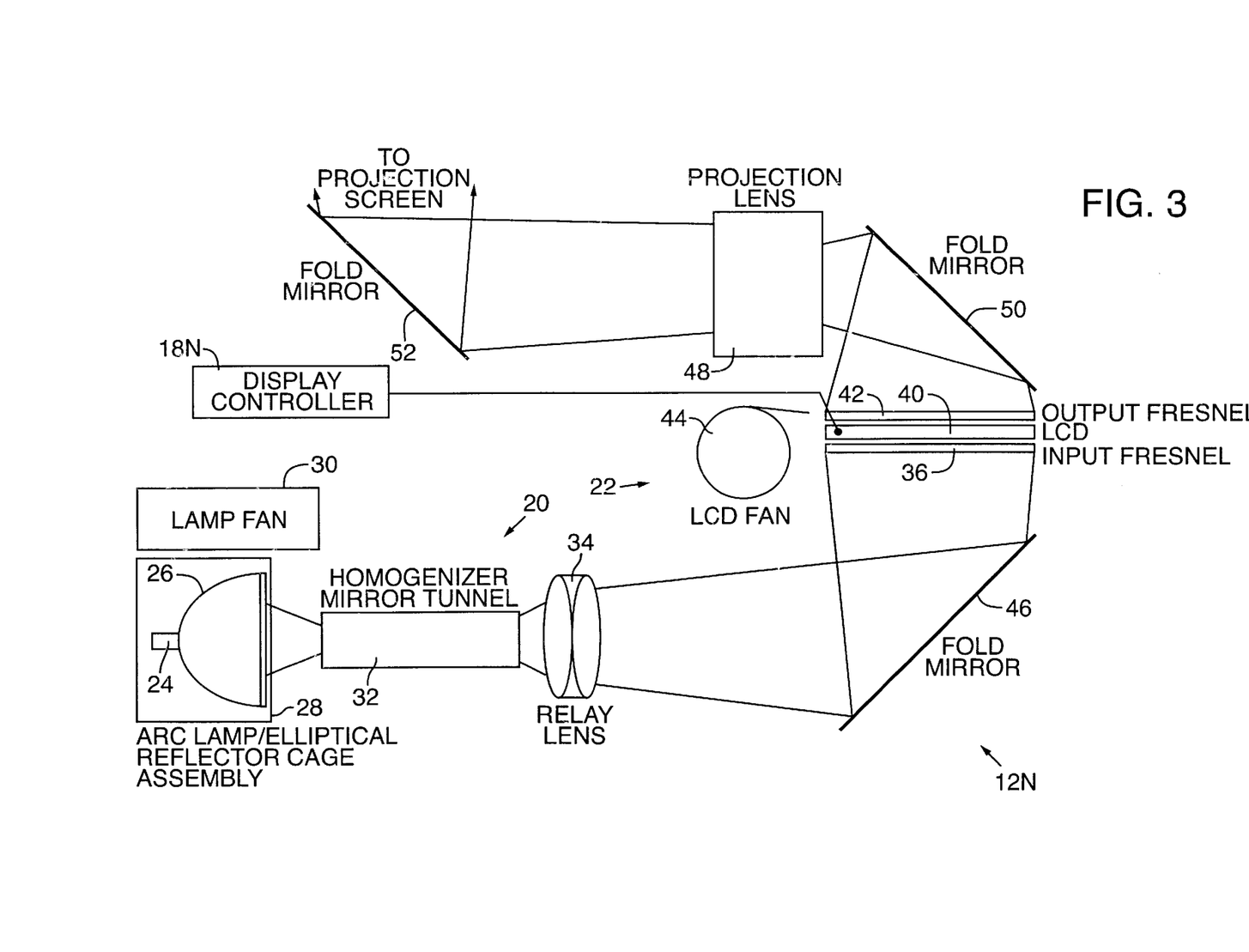
FIG. 3 is a simplified block diagram of an LCD projection unit of this invention that is suitable for use in the multiscreen display system of FIG. 2.

FIG. 3 shows a representative one, for example 12N, of LCD projection units 12, which is suitable for use with this invention. LCD projection unit 12N includes two primary subsections: a lamp assembly 20 and an LCD assembly 22.

Lamp assembly 20 preferably includes a tungsten halogen or metal halide arc lamp 24 enclosed in an elliptical reflector 26 and housed in a cage assembly 28, all of which are cooled by a lamp fan 30. Arc lamp 24 is preferably a model L5341 manufactured by Hamamatsu located in Hamamatsu, Japan. Lamp assembly 20 further includes a homogenizer mirror tunnel 32 and a relay lens 34 that may have an optional integral ultraviolet/infrared ("UV/IR") filter such that LCD assembly 22 is supplied with a substantially uniform field of visible light.

Regarding luminance variations in lamp assembly 20, aging factors primarily include dimming over time of arc lamp 24 and degradation of coatings on elliptical reflector 26 and any optional UV/IR filter in relay lens 34. These aging factors reduce the overall luminance and change the color of the light reaching LCD assembly 22.

The lifetime rating of a typical tungsten halogen or metal halide arc lamp is based on the mean life of the lamp to 50 percent of its initial luminance. Moreover, the luminance of new lamps varies by as much as 20 percent. These two factors account for a possible 60 percent luminance variation between LCD projection units 12 in multiscreen display system 10.

LCD assembly 22 preferably includes input Fresnel lens 36, an optional attenuator polarizer (not shown), an LCD array 40, and an output Fresnel lens 42, all of which are cooled by an LCD fan 44. The optional attenuator polarizer provides luminance control without any color balance interaction. However, because its absorbance limits the luminance available from LCD projection unit 12, a preferred luminance control technique is described later with reference to FIGS. 3 and 7.

LCD array 40 is preferably a model LQ64P312 manufactured by Sharp Microelectronics located in Nara, Japan. LCD assembly 22 is optically coupled to lamp assembly 20 by an input fold mirror 46 and is optically coupled to a projection screen (not shown) by a projection lens 48 and fold mirrors 50 and 52.

Regarding color and light transmittance variations in LCD assembly 22, LCD array 40 manufacturing process and lot variations affect the transmitted luminance and color modulation of the light received from lamp assembly 20, thereby causing the luminance and color of the image on the projection screen to vary among projection units 12. It is possible that LCD assembly 22 variations also occur over time because color filters and polarizers change with temperature and prolonged exposure to intense light. Temperature variations among LCD projection units 12 may also introduce color and luminance variations. However, these variations account for less than about a 5 percent difference in luminance and considerably less in color.

The variables controlling luminance and color in LCD projection units 12 may be modeled as an overall transfer function of the R, G, and B video input voltages to an image spectral output defining color and luminance values. In the overall transfer function, every unique combination of R, G, and B input voltages results in a spectral response perceived as a color with a particular luminance value. This invention maintains a substantially uniform overall transfer function among LCD projection units 12 as the lamp assembly 20 and LCD assembly 22 variables change.

The overall transfer function may be modeled as a combination of a lamp assembly 20 spectrum model and an LCD assembly 22 spectrum model.

Figure 4A:
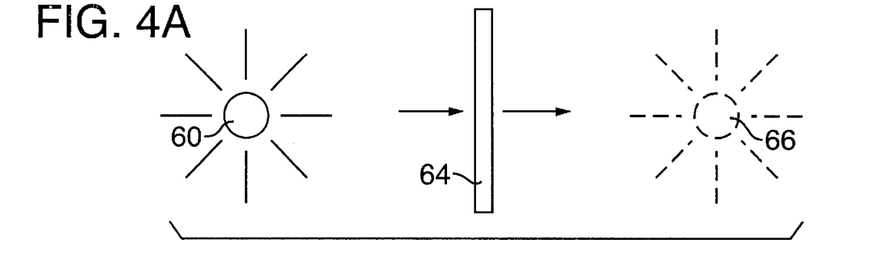
FIGS. 4A–4C are simplified pictographical representations of a lamp assembly spectrum model of the LCD projection unit of FIG. 3.
Figure 4B:
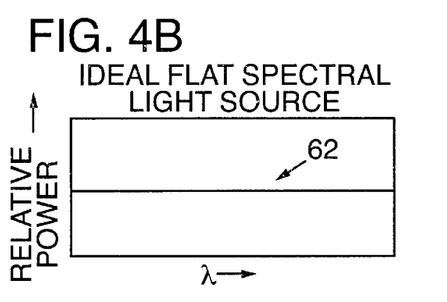
Figure 4C:
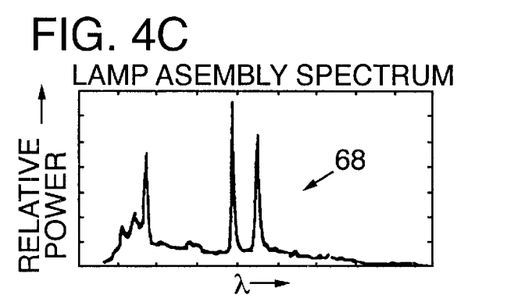

FIGS. 4A–4C show the development of a lamp assembly spectrum model for LCD projection units 12. FIG. 4A depicts the overall lamp assembly spectrum model as an ideal lamp 60 having an ideal flat light spectrum 62 as shown in FIG. 4B combined with a modeling filter 64 describing the combined effects of elliptical reflector 26, any optional UV/IR filter in relay lens 34, and the actual spectral output of arc lamp 24 (all of FIG. 3). Variations in these components result in different modeling filters. The resultant lamp assembly spectrum model is a modeled lamp assembly 66 (shown in dashed lines) having a modeled lamp assembly spectrum 68 as shown in FIG. 4C.

Figure 5A:
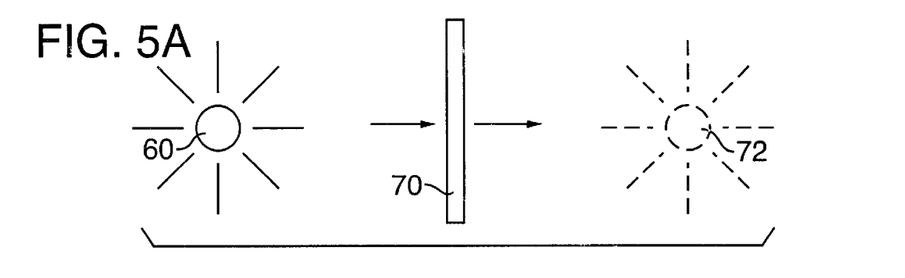
FIGS. 5A–5C are simplified pictographical representations of an LCD spectrum model of the LCD projection unit of FIG. 3.
Figure 5B:
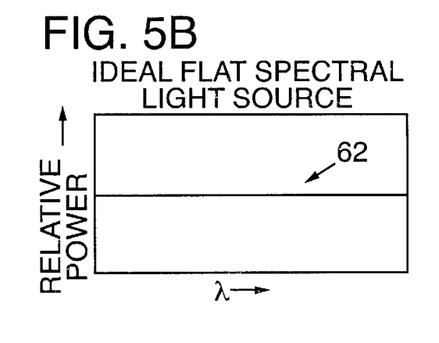
Figure 5C:
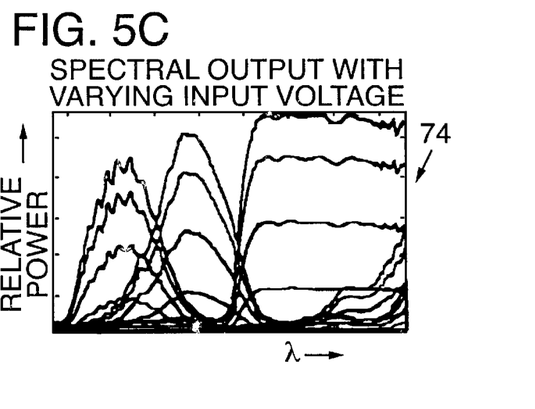

In like manner, FIGS. 5A–5C show the development of an LCD and polarizer assembly spectrum model for LCD projection units 12. FIG. 5A again shows ideal lamp 60 having ideal flat light spectrum 62 as shown in FIG. 5B. However, this time ideal lamp 60 is combined with a modeling filter 70 describing the combined effects of input Fresnel lens 36, any optional attenuator polarizer, LCD array 40, and output Fresnel lens 42 (all of FIG. 3) in response to a set of R, G, and B input voltages. Again, variations in these components result in different modeling filters. The resultant LCD and polarizer assembly spectrum model is a modeled LCD and polarizer assembly 72 (shown in dashed lines) having a set of modeled LCD and polarizer transmission spectra 74 as shown in FIG. 5C.

Figure 6A:
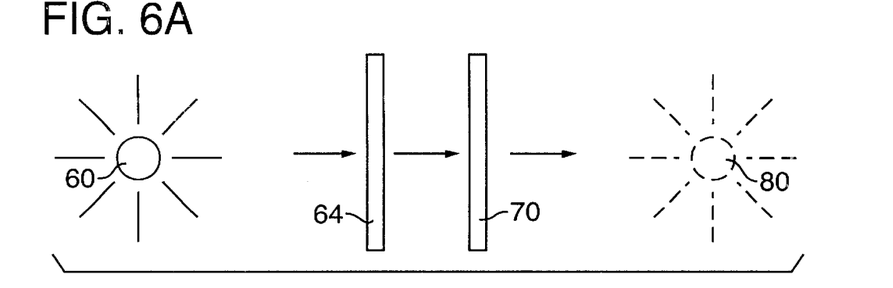
FIGS. 6A–6C are simplified pictographical representations of an overall spectral transmission model of the LCD projection unit of FIG. 3.
Figure 6B:
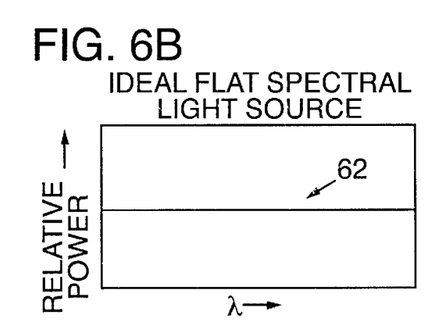
Figure 6C:
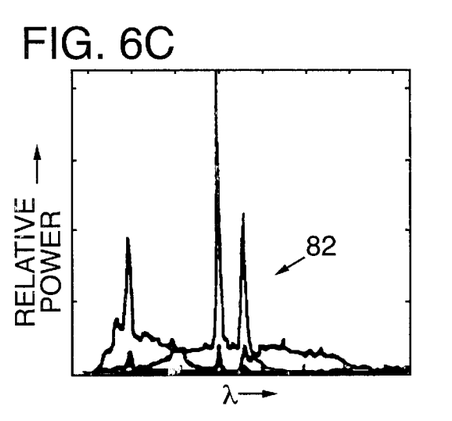

It then follows that FIGS. 6A–6C show the development of an overall transfer function model for exemplary LCD projection unit 12N of FIG. 3. FIG. 6A again shows ideal lamp 60 having ideal flat light spectrum 62 as shown in FIG. 6B. However, this time ideal lamp 60 is combined with a cascaded combination of lamp assembly modeling filter 64 and LCD and polarizer assembly modeling filter 70. The resultant overall transfer function model is a modeled projection unit 80 (shown in dashed lines) having a set of modeled light projection spectra 82 as shown in FIG. 6C. Unlike the multiple amplitudes of spectra shown in FIG. 5C, to improve clarity, FIG. 6C shows only a single spectrum amplitude for each primary color. Skilled workers will understand that multiple amplitudes of spectra exist and depend on the R, G, and B, input voltages to modeled projection unit 80.

Referring again to FIG. 2, LCD projection units 12 cooperate with a color and luminance control system incorporated within display controllers 18 to maintain luminance uniformity and color balance among all the LCD projection units forming multiscreen display system 10. Its goal is to maintain luminance uniformity and color balance with a minimum of user adjustment during the rated life of multiscreen display system 10. In practice, calibration of the color and luminance control system is characterized to the S-curve response of the particular model of LCD array 40 employed. Thereafter, when LCD projection units 12 are manufactured, color balance adjustments are usually stable for extensive time periods with luminance adjustments being required only when arc lamp 24 is replaced. Of course, both color balance and luminance adjustments may be made at any time to suit particular application requirements or user tastes. Skilled workers will also recognize that LCD array 40 need not be a unitary multicolored array, but that this invention also applies to display systems employing separate LCDs for each color. In such a case, the S-curve responses for each LCD would be separately measured.

The color and luminance control system employs the principles of independent luminance and color control revealed by the modeled projection unit 80 (FIGS. 6A–6C) and as described in more detail below.

Color and luminance balance may be implemented according to at least two methods. A first method employs establishing reference color and luminance values and adjusting LCD projection units 12 to achieve those values. To obtain the maximum useful lifetime from arc lamp 24 (FIG. 3), the reference luminance value is preset to its expected end of life luminance value (50 percent of its initial luminance). This results in LCD projection units 12 that may never achieve their maximum potential luminance, but which are "plug and play" luminance and color balanced according to the reference values.

A second, preferred method, employs setting the reference luminance value to the lowest common value of maximum luminance among the set of LCD projection units 12 to be used in multiscreen display system 10. This method is advantageous because the reference luminance value is not arbitrarily set to a predetermined minimum level but is set to the highest value possible for luminance and color balance capability among the set of LCD projection units employed.

In both of these methods, the color balance is established by setting a selected ratio of R, G, and B luminance values. The ratio is preferably user adjustable and defines a white point or color temperature for multiscreen display system 10.

For each associated pair of LCD projection units 12 and display controllers 18, the color and luminance control system employs a master luminance control that controls the overall luminance of the LCD projection unit without changing its color balance and a gamma correction adjustment that controls the gain settings of each color individually while converting the transfer function of LCD array 40 from its characteristic S-curve response into a well-known gamma curve. The gamma curve is suitable for matching sets of R, G, and B video input voltages from video signal source 14 to corresponding luminance and color values that are linearly perceived by a human eye.

A master luminance control may be implemented to a limited extent by simply adjusting the supply voltage to arc lamp 24. However, reducing the supply voltage to arc lamp 24 beyond a small amount causes undesirable color shifts and unreliable operation of the lamp. Therefore, because of the wide luminance control range required, it is preferred to operate arc lamp 24 at its rated voltage and adjust the operating range of LCD array 40 accordingly. How this is done without altering the color balance is described below with reference to FIGS. 3 and 7.

LCD array 40, being of a particular type and manufacturer, has a corresponding LCD S-curve response at its operating temperature. Therefore, the particular S-curve response for LCD array 40 is measured at its operating temperature, preferably 40 degrees Celsius, for each primary color using lamp assembly 20 as an illumination source. This is necessary because the particular filter materials, LCD design characteristics, and operating temperature ranges employed may cause differences in the R, G, and B S-curve responses.

Figure 7:
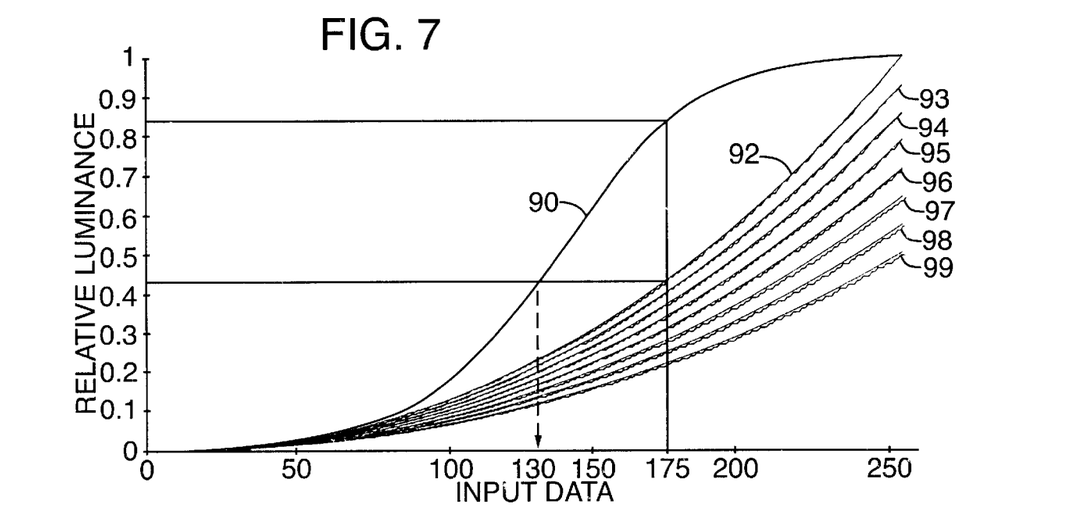
FIG. 7 is a graphical representation of an LCD S-curve response and a corresponding set of gamma response curves generated from the S-curve response in a manner according to this invention.

FIG. 7 shows a representative measured S-curve 90 response in which luminance is plotted versus input voltage for an arbitrary one of the R, G, or B colors transmitted by LCD array 40. In FIG. 7, the input voltage is shown as eight-bit input data values ranging from zero to 256, which drive a digital-to-analog converter ("DAC") that provides the input voltages to LCD array 40. A separate DAC is employed for each primary color. Of course, greater or fewer than 256 data values may be employed, but 256 are preferred.

Measuring the S-curve response entails sensing absolute luminance values of a primary color in response to a range of input data values driving LCD array 40, digitizing the sensed luminance values, and storing a sensed data value corresponding to each input data value. The process is repeated for each primary color. Preferably, a sampling of 64 uniformly separated data values are generated and sensed. Intermediate data values may be generated by frame rate conversion techniques to yield a total of 256 gray shades per color. Alternatively, intermediate sensed data values may be calculated using one of many well-known curve-fitting or interpolation algorithms.

Sensing the luminance values may employ an external detector such as a charge-coupled device camera or photometer that senses the luminance of the projection screen. Alternatively, an internal sensor, such as a photodetector, may be employed and mechanically positioned into a concentrated portion of the light path during the measuring period to integrate the total luminance to the projection screen. The internal photodetector may be adapted to make LCD projection units 12 automatically self-calibrating. External detectors typically require manual set up and calibration.

The measured response represented by S-curve 90 is stored as a set of 256 luminance data values that correspond to the 256 input data values. For example, referring again to FIG. 7, input data value 175 causes LCD array 40 to transmit about 0.84 of its maximum luminance. However, as described above, properly matching the response of LCD array 40 to video signal sources and to the human eye response requires converting S-curve 90 to a gamma corrected response 92. Therefore, when LCD array 40 is gamma corrected, input data value 175 should cause LCD array 40 to transmit about 0.42 of its maximum luminance.

Gamma correction is implemented by a processor (not shown) that converts each input data value used to generate S-curve 90 into a corresponding corrected input data value required to generate a corresponding gamma corrected luminance value. For example, the processor receives input data value 175, determines from gamma corrected response 92 that the gamma corrected luminance value is about 0.42, accesses the stored set of luminance values for S-curve 90, and determines that corrected data value 130 corresponds to luminance value 0.42. The processor then loads corrected data value 130 into a lookup table at an address location 175. This process is repeated for each input data value until the lookup table stores a corrected data value for each possible input data value. Studying FIG. 7 reveals that the corrected input values are substantially the same as the input data values for input data values between zero and about 75, deviate substantially for input data values between about 75 and 250, and merge to substantially equality again at an input value of 256.

Luminance correction is also implemented by the processor and lookup table method. However, for luminance correction, the processor scales gamma corrected response 92 into a set of gain and gamma corrected responses 93–99 that have luminance responses ranging respectively from about 0.9 to about 0.5 of the corresponding luminance responses of gamma corrected response 92. For clarity, FIG. 7 shows a set of only eight gamma corrected responses, but 32 luminance responses are preferred ranging from about 0.98 to about 0.5 of the corresponding luminance responses of gamma corrected response 92. Then, as for gamma corrected response 92, the processor uses each of gain and gamma corrected responses 93–99 to load corresponding corrected data values into the lookup table for each input data value until the lookup table stores a corrected data value for each possible input data value and for each of gain and/or gamma corrected responses 92–99. The different sets of corrected data values may be accessed from the lookup table by conventional address offsetting, paging, or multiplexing techniques. This process is repeated for each primary color transmitted by LCD array 40.

After the above-described lookup table values are determined, they are preferably permanently stored in a read-only memory ("ROM") that "characterizes" the particular type of LCD array 40. The ROM may be duplicated and used in the manufacture of LCD projection units 12 that employ that particular type of LCD array 40. If the type or manufacturer of LCD array 40 is changed, a new set of lookup table values are determined and stored in a different ROM.

Using the ROM lookup tables, LCD projection unit 12N is adjusted to particular luminance and color balance values according to the following example. Because FIG. 7 shows only eight gain and/or gamma corrected responses (92–99), and the lookup tables contain 32 responses for each of the R, G, and B color, specific sets of lookup table values will hereafter be designated by color and number, e.g., R=1, R=2, . . . R=32; G=1, G=2. . . G=32; and B=1, B=2, . . . B=32.

The R, G, and B input data values are set to their maximum values (256 in this example).

Particular sets of lookup tables are interactively selected that cause the resulting displayed R, G, and B maximum values to generate a reference white color. An exemplary selected set may be R=32, G=30, and B=24. The resulting 32:30:24 ratio determines the selected color balance.

The luminance may be adjusted down from the maximum level by selecting different sets of lookup table values that track in the same 32:30:24 ratio. For example, LCD projection unit 12 may be adjusted to half luminance with the same color balance by selecting R=16, G=15, B=12.

The above described selections are preferably made manually by selecting among menu values generated by display controller 18 and displayed on the projection screen. Preferred menus showing the maximum and half luminance setting examples are represented below in Tables 1 and 2.

TABLE 1

| COLOR | VALUE |
|-------|-------|
| ALL   | 32    |
| RED   | 32    |
| GREEN | 30    |
| BLUE  | 24    |

TABLE 2

| COLOR | VALUE |
|-------|-------|
| ALL   | 16    |
| RED   | 16    |
| GREEN | 15    |
| BLUE  | 12    |

Initially, ALL, RED, GREEN, and BLUE have "32" entered as default values. The color balance values are preferably entered by typing 1–32 color values into the selected color dialog boxes. Various values are selected until the desired color balance is achieved. Alternatively, the values may be interactively selected using an infrared remote control unit, mouse and cursor, or keyboard direction arrow keys.

The luminance is next adjusted by typing into the ALL dialog box a desired relative value, e.g., 16. The RED, GREEN, and BLUE values are automatically scaled by the processor to maintain the selected color balance ratio.

The above-described adjustment procedure may be repeated as needed to maintain the luminance and color balance values desired for LCD projection unit 12N. The procedure may need to be repeated more often when LCD projection unit 12N is in an array of LCD projection units 12 forming multiscreen display system 10.

Alternatively, the adjustment procedure may be implemented automatically by employing image sensors are described above. In multiscreen display system 10, automatic adjustment may further employ sensors in each of LCD projection units 12 that intercommunicate among associated display controllers 12 to achieve a luminance and color balance that is common to all LCD projection units 12. It is envisioned that such intercommunication would be RS-232 data communication among the processors employed to select from among the sets of lookup tables installed in each of LCD projection units 12.

Figure 8:
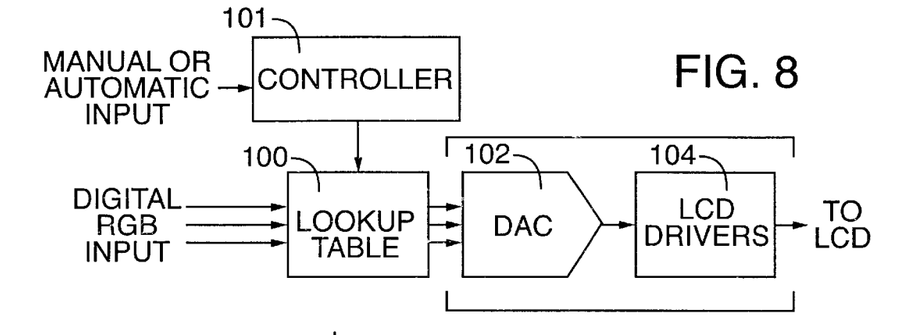
FIG. 8 is a simplified block diagram of a preferred digital embodiment of a luminance and color balance controller of this invention.

FIG. 8 shows a preferred digital embodiment of a luminance and color balance controller of this invention. In this embodiment, eight bits each of R, G, and B digital input data are received from multiscreen display driver 16. A lookup table 100 stores the sets of gamma corrected data values described above. A controller 101, such as the above-described processor, is employed to manually or automatically select from among the sets of lookup tables. Lookup table 100 receives the R, G, and B, digital input data and converts it to corrected data values in accordance with the selected sets of lookup table values. A DAC 102 receives the corrected data values and provides corresponding voltages that are conditioned by an LCD driver amplifier 104 into R, G, and B input voltages received by LCD array 40. Preferably, DAC 102 and LCD drivers 104 are integrated in a commercially available package.

Figure 9:
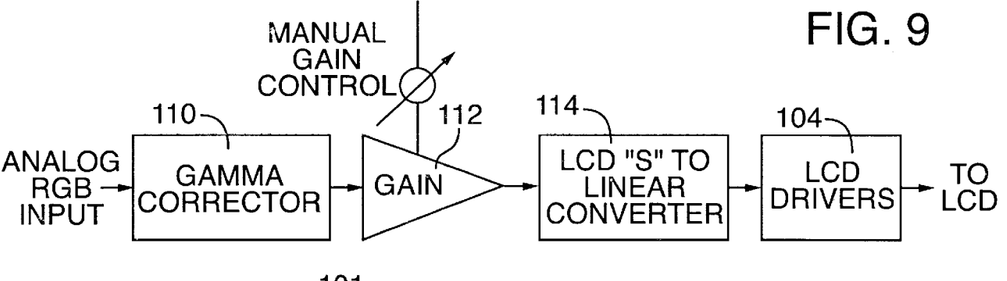
FIG. 9 is a simplified block diagram of an alternative analog embodiment of the luminance and color balance controller of this invention.

FIG. 9 shows an alternative analog embodiment of the luminance and color balance controller of this invention. In this embodiment, R, G, and B analog input voltages are received from multiscreen display driver 16. A gamma corrector 110 receives the analog input voltages and applies a nonlinear gain function to provide a gamma corrected input-to-output response substantially like gamma corrected response 92 of FIG. 7. A variable gain stage 112 receives the gamma corrected analog input voltages and provides for matching maximum R, G, and B gamma corrected input voltages to the reference color values. An S-to-linear converter 114 employs piecewise linear approximation to compensate for the characteristic S-curve response of LCD array 40. The resulting gamma, gain, and S-curve corrected input voltages are conditioned by LCD driver amplifier 104 into R, G, and B input voltages received by LCD array 40.

Figure 10:
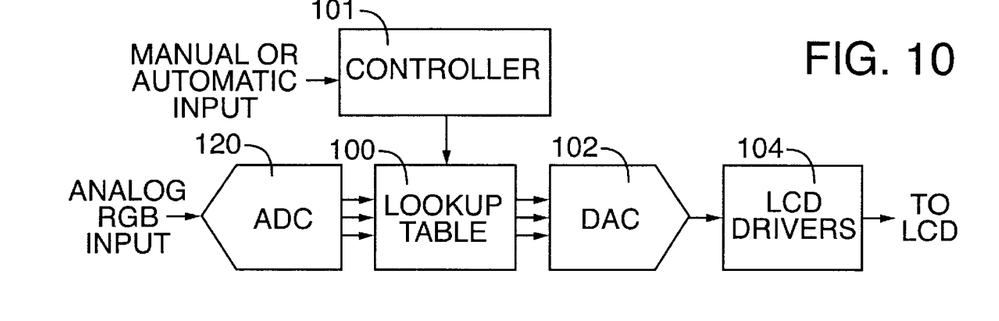
FIG. 10 is a simplified block diagram of an alternative hybrid analog/digital embodiment of the luminance and color balance controller of this invention.

FIG. 10 shows an alternative hybrid analog/digital embodiment of the luminance and color balance controller of this invention. In this embodiment, R, G, and B analog input voltages are received from multiscreen display driver 16 and digitized by an analog-to-digital converter 120 into eight bits each of R, G, and B digital input data. The remainder of this embodiment is substantially the same as for the preferred embodiment of FIG. 8.

Referring again to FIG. 2, the above-described system of color balancing involves characterizing the intrinsic responses of LCD projection units 12, and mapping those responses in a system of lookup tables having sets of LCD transfer function corrected gains to control the mixing of R, G, and B color components of a projected image to achieve a predetermined luminance and color balance.

In practice the system performs well for matching the white and gray-scale colors of individual projection units 12 to each other, but does not always match the R, G, and B primary colors. If for some reason the primaries are not well matched, the system cannot correct the mismatch. This is noticeable when, for example, blue sky backgrounds are displayed across multiple projection units 12. The inability to match primary colors is caused by color temperature differences (spectral peak differences) among lamps 24 or lamp batches, LCD 40 color filter imbalances and color leakages (color interaction), and aging of optical components in the light path.

Figure 11:
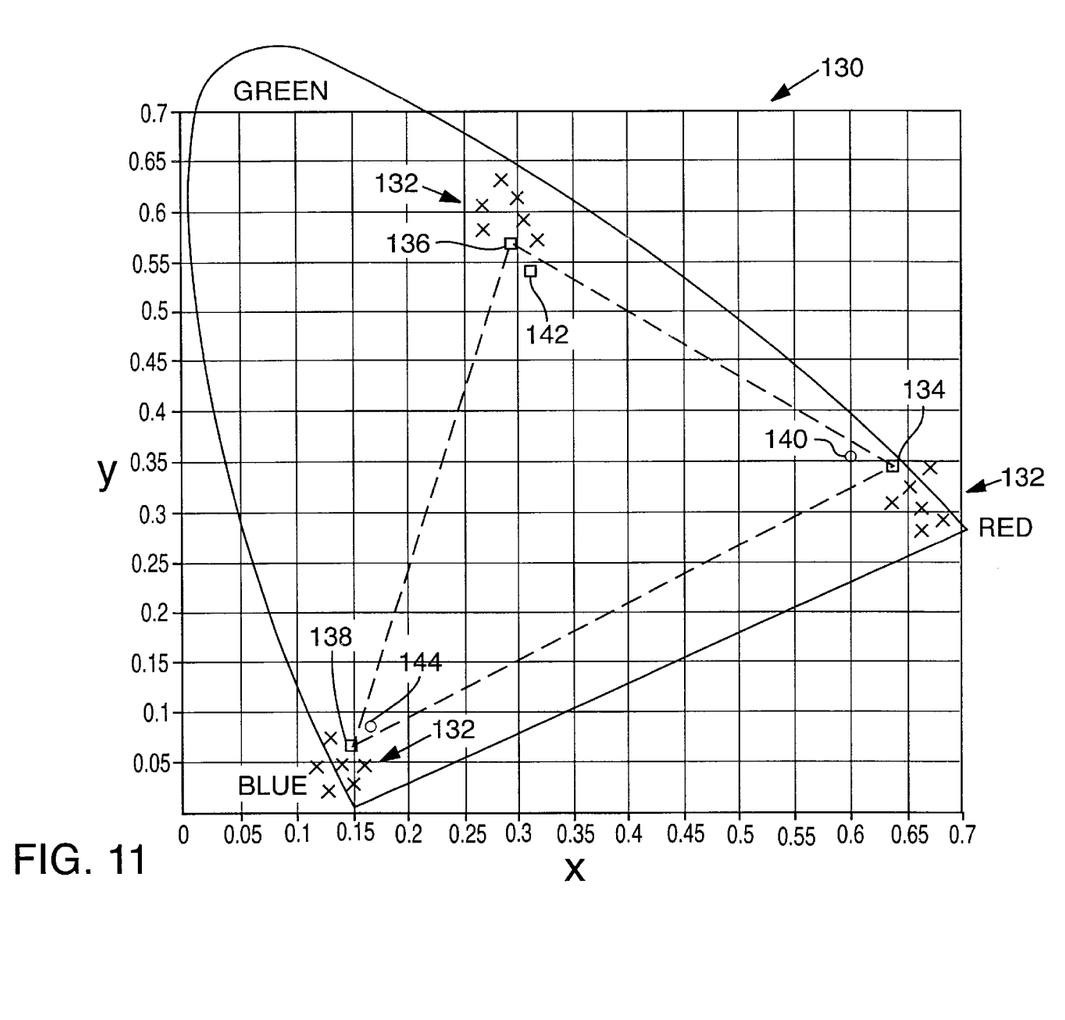
FIG. 11 is a CIE color diagram showing measured color gamuts for a representative sample of LCD projection units and further showing a set of primary color target coordinates to which the LCD projection units are adjusted in accordance with this invention.

FIG. 11 is a CIE color diagram showing the resulting clusters of measured maximum color coordinates 132 for a representative sample of LCD projection units 12 including respective measured maximum R, G, and B coordinates 134, 136, and 138 for an example LCD projection unit 12 taken from the sample. Measured maximum color coordinates 132 represent the maximum saturated luminances possible from each of the primary colors displayed by each of LCD projection units 12. The dashed lines joining R, G, and B coordinates 134, 136, and 138 define the color gamut for example projection unit 12. Some LCD projection units 12 may have larger or smaller gamuts, but the point is, that the maximum primary color saturations and hues vary slightly among the members of the sample.

Digital or analog embodiments of a color gamut correction system of this invention are combined with the above-described luminance and color balancing system to match primary colors in addition to white and luminance values. The combined systems provide suitable color matching for any image, and solves a fundamental problem in multiscreen display systems, not just those having nonlinear transfer function characteristics. Accordingly, this invention may also be employed in, for example, LCD devices, CRTs, color plasma devices, digital light processing devices, deflected mirror devices, and in projection displays employing those devices.

The primary colors are adjusted by a method of color mixing implemented by processing a mathematical matrix algorithm that generates modified color coordinate values that are conveyed to a color space conversion circuit. For example, mixing a small amount of G into the R turns the R slightly greenish, or mixing a small amount of B into the R turns the R bluish.

The primary color matching algorithm involves measuring the intrinsic colors coordinates of the primaries, determining a set of predetermined target coordinates, performing matrix operations to calculate a set of coefficients that are used in the color space conversion circuit to convert the measured to the target coordinates, thereby matching the primary colors. Measuring the intrinsic colors coordinates of the primaries entails factory measurement of each projection unit 12 using conventional photometric measurement instruments and techniques.

Matching primary colors requires determining a set of predetermined R, G, and B target coordinates 140, 142, and 144 that are displayable by all LCD projection units 12. As shown in FIG. 11, R, G, and B target coordinates 140, 142, and 144 lie within the gamuts of all of projection units 12 and, therefore, represent a slight tradeoff between color saturation and primary color matching.

When the primary color are matched, the above-described color balance and luminance matching technique is employed to adjust the white and gray balance to result in a well-matched multiscreen display system.

The primary color matching technique is preferably carried out by performing a matrix multiplication (color space conversion) on the incoming primary color signals as shown below.

$$\begin{bmatrix} Rout \\ Gout \\ Bout \end{bmatrix} = \begin{bmatrix} Rr & Rg & Rb \\ Gr & Gg & Gb \\ Br & Bg & Bb \end{bmatrix} \cdot \begin{bmatrix} Rin \\ Gin \\ Bin \end{bmatrix}$$

Where Rin, Gin, and Bin are the incoming color signals, Rout, Gout, and Bout are the resultant color signals, and Rr, Rg, Rb, Gr, Gg, Gb, Br, Bg, and Bg are the coefficients of the color matrix multiplier requiring calculation.

Carry out the following procedure to calculate the coefficients for the conversion matrix.

1. Measure the red, green, and blue brightness (Y) and CIE color coordinates (x,y) of the projection unit 12 under test with unaltered signals. Example values are shown below.

| Red | Yr = 25.4 | xr = 0.380 | yr = 0.345 |
|---|---|---|---|
| Green | Yg = 104.0 | xg = 0.296 | yg = 0.569 |
| Blue | Yb = 13.5 | xb = 0.146 | yb = 0.066 |

Where Yr, Yg, and Yb are the brightness values of the red, green, and blue primaries and (xr,yr), (xg,yg), and (xb,yb) are the 1936 CIE color coordinates of the respective red, green, and blue primaries.

2. Define the desired target CIE color coordinates (x,y) for Red, Green, Blue, and White.

| Red | Txr = 0.600 | Tyr = 0.355 | |
|---|---|---|---|
| Green | Txg = 0.313 | Tyg = 0.540 | |
| Blue | Txb = 0.165 | Tyb = 0.085 | |
| White | Txw = 0.285 | Tyw = 0.310 | TYw = 100.0 |

Where (Txr,Tyr), (Txg,Tyg), (Txb,Tyb), and (Txw,Tyw) are the 1936 CIE color coordinates of the respective red, green, blue, and white target primaries, and TYw is white brightness baseline value of 100.0.

3. Calculate red, green, and blue target brightness ratios required to achieve a desired target white chromaticity. This is achieved by finding TYr, TYg, and TYb from the following equations.

$$TXw = Txr\frac{TYr}{Tyr} + Txg\frac{TYg}{Tyg} + Txb\frac{TYb}{Tyb}$$

$$TYw = TYr + TYg + TYb$$

$$TZw = \left[-TYr\frac{(Txr + Tyr - 1)}{Tyr}\right] + \left[-TYg\frac{(Txg + Tyg - 1)}{Tyg}\right] + \left[-TYb\frac{(Txb + Tyb - 1)}{Tyb}\right]$$

The solution to these equations using the example data set forth above is:

TYr=15.44, TYg=72.2, and TYb=12.36.

4. Convert from Y,x,y color space to XYZ color primaries to perform further calculations. This conversion employs the well known 1931 CIE specification formulas:

$$X = \left(\frac{x}{y}\right)Y, \quad Y = Y \quad \text{and} \quad Z = \left[\frac{(1 - x - y)}{y}\right]Y.$$

5. After calculating the conversions, solve the following three sets of equations for red, green, and blue so that the color matrix multiplier can properly convert the color primaries.

Red:
TXr=RrXr+GrXg+RrXb
TYr=RrYr+GrYg+BrYb
TZr=RrZr+GrZg+BrZb
Green:
TXg=RgXr+GgXg+BgXb
TYg=RgYr+GgYg+BgYb
TZg=RgZr+GgZg+BgZb
Blue:
TXb=RbXr+GbXb+BbXb
SYb=RbYr+GbYg+BbYb
SZb=RbZr+GbZg+BbZb Where Xr, Yr, Zr, Xg, Yg, Zg, Xb, Yb, and Zb are the 1931 CIE tristimulus color values for red green and blue.

6. Insert the resulting values into the nine equations shown in FIGS. 12A to 12I to calculate the values of the matrix coefficients Rr, Gr, Br, Rg, Gg, Bg, Rb, Gb, and Bb required by the above-defined matrix multiplication.

Repeat the above-described technique for each LCD display unit 12 using its measured color coordinate values and the same target coordinate values.

Figure 13:
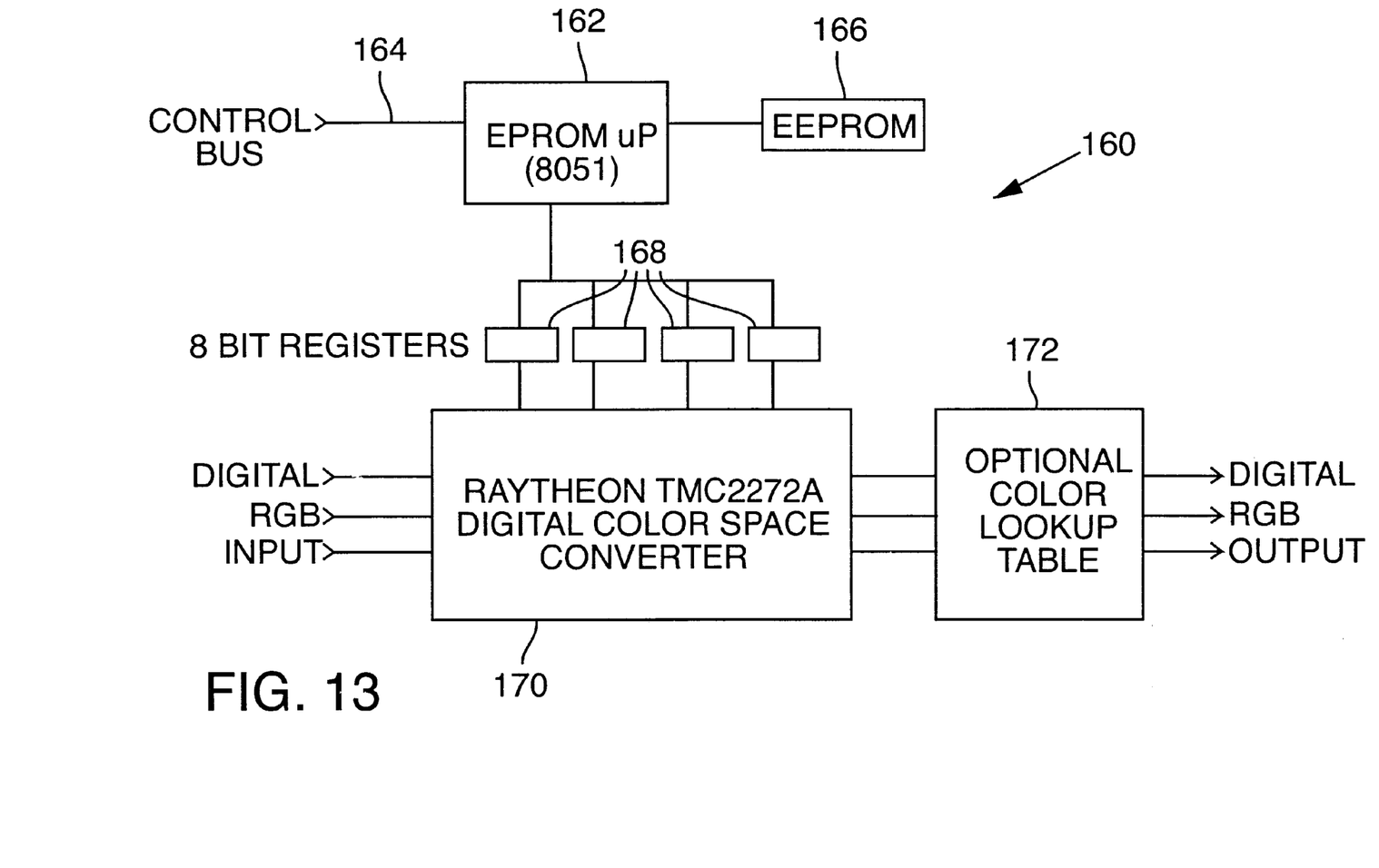
FIG. 13 is a simplified schematic block diagram of a digital color space converter circuit embodiment of this invention.

FIG. 13 shows a preferred digital embodiment of a color space converter circuit 160 of this invention. A microprocessor 162, preferably an EPROM programmable type 8051, receives the calculated coefficients over a control bus 164 and stores them in an EPROM 166.

Optionally, microprocessor 162 can store a program that executes the above-described mathematical matrix algorithm. In this case, microprocessor 162 receives the measured and target coordinate values over control bus 164. The mathematical matrix algorithm is executed to generate the coefficients required by the equations of FIG. 12 to convert measured R, G, and B coordinate values 134, 136, and 138 to target R, G, and B coordinate values 140, 142, and 144. The measured and target coordinates and associated calculated coefficients are stored in an EPROM 166. Microprocessor 162 can recalculate and change the stored coefficients whenever a lamp 24, LCD 40, or other light path component is replaced that changes the measured R, G, and B coordinate values of the LCD projection unit 12.

Whenever color space converter circuit 160 is powered up, microprocessor 162 retrieves the coefficient values from EPROM 166 and loads them into 8-bit registers 168 for presentation to a digital color space converter 170, preferably a Raytheon part No. TMC2272A. Thereafter, digital R, G, and B data conforming to the measured R, G, and B coordinate values will be converted by digital color space converter 170 to digital R, G, and B data conforming to the target R, G, and B coordinate values. An optional color lookup table 172 can further modify the data in well-known ways.

Color space converter circuit 160 provides digital RGB output data to the previously-described luminance and color balance system at, for example, the digital RGB inputs to lookup tables 100 of FIGS. 8 and 10 or through ADCs to the analog RGB inputs of gamma corrector 110 of FIG. 9.

Figure 14:
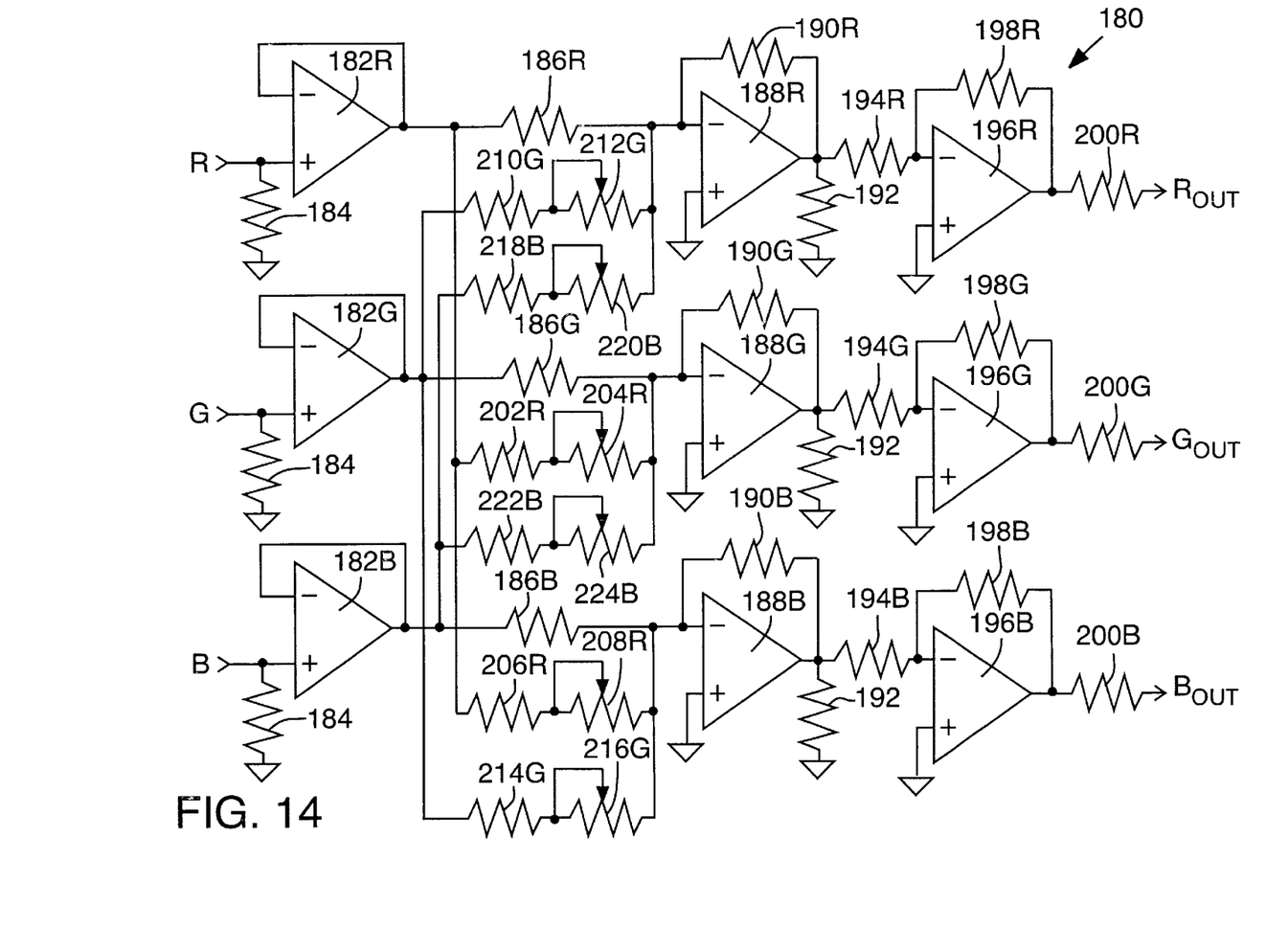
FIG. 14 is a simplified schematic block diagram of an analog color space converter circuit embodiment of this invention.

FIG. 14 shows an analog embodiment of a color space converter circuit 180 of this invention. Analog R, G, and B signals conforming to the measured R, G, and B coordinate values is received at the noninverting inputs of respective buffer amplifiers 182R, 182G, and 182B. 75 ohm terminating resistors 184 are optionally connected to the noninverting inputs of amplifiers 182. The buffered R, G, and D signals are connected through 1,000 ohm resistors 186R, 186G, and 186B to the inverting inputs of summing amplifiers 188R, 188G, and 188B, which are set to unity gain by 1,000 ohm feedback resistors 190R, 190G, and 190B. The outputs of summing amplifiers 188, which are optionally terminated by 1,000 ohm resistors 192, are connected through 620 ohm resistors 194R, 194G, and 194B to the inverting input of amplifiers 196R, 196G, and 196B, the gains of which are set to about two by 1,200 ohm feedback resistors 198R, 198G, and 198B. The outputs of amplifiers 196 are connected through 75 ohm terminating resistors 200R, 200G, and 200B to respective output terminals Rout, Gout, and Bout. Analog color space converter circuit 180 provides at the output terminals a noninverting gain of about two for the analog R, G, and B signals. All amplifiers are preferably commercially available type EL2444 amplifiers, which are available four to a package.

Small amounts of the other two color signals are added as described below to each of the buffered R, G, and B color signals.

The buffered R signal is connected through a 10 kohm resistor 202R and a 100 kohm adjustable resistor 204R to the noninverting input of summing amplifier 188G. Adjusting adjustable resistor 204R adds variable amounts of R signal to the G signal. The adjustment is functionally equivalent to adjusting an associated one of the coefficients driving digital color space converter 170 (FIG. 13).

The buffered R signal is also connected through a 10 kohm resistor 206R and a 100 kohm adjustable resistor 208R to the noninverting input of summing amplifier 188B. Adjusting adjustable resistor 208R adds variable amounts of R signal to the B signal. The adjustment is functionally equivalent to adjusting an associated one of the coefficients driving digital color space converter 170 (FIG. 13).

The buffered G signal is connected through a 10 kohm resistor 210G and a 100 kohm adjustable resistor 212G to the noninverting input of summing amplifier 188R. Adjusting adjustable resistor 212G adds variable amounts of G signal to the B signal. The adjustment is functionally equivalent to adjusting an associated one of the coefficients driving digital color space converter 170 (FIG. 13).

The buffered G signal is also connected through a 10 kohm resistor 214G and a 100 kohm adjustable resistor 216G to the noninverting input of summing amplifier 188B. Adjusting adjustable resistor 216G adds variable amounts of G signal to the B signal. The adjustment is functionally equivalent to adjusting an associated one of the coefficients driving digital color space converter 170 (FIG. 13).

The buffered B signal is connected through a 10 kohm resistor 218B and a 100 kohm adjustable resistor 220B to the noninverting input of summing amplifier 188R. Adjusting adjustable resistor 220B adds variable amounts of B signal to the R signal. The adjustment is functionally equivalent to adjusting an associated one of the coefficients driving digital color space converter 170 (FIG. 13).

The buffered B signal is also connected through a 10 kohm resistor 222B and a 100 kohm adjustable resistor 224B to the noninverting input of summing amplifier 188G. Adjusting adjustable resistor 224B adds variable amounts of B signal to the G signal. The adjustment is functionally equivalent to adjusting an associated one of the coefficients driving digital color space converter 170 (FIG. 13).

Skilled workers will understand that the above-described component types and values are preferred values and that various of component types and values are possible for adapting the invention to particular applications. Furthermore, while R, G, and B primary colors are described, the invention is equally applicable to color spaces using other primary colors, or other combinations of colors.

Analog color space converter circuit 180 provides analog RGB output data to the previously-described luminance and color balance system at, for example, the analog RGB inputs of gamma corrector 110 or variable gain stage 112 FIG. 9; the analog RGB inputs of ADC 120 of FIG. 10; or the inputs to LCD drivers 104 of FIGS. 8, 9, and 10.

It will be obvious to those having skill in the art that many changes may be made to the details of the above-described embodiments of this invention without departing from the underlying principles thereof. Accordingly, it will be appreciated that this invention is also applicable to multiscreen displays other than those found in multiscreen LCD projection applications. The scope of the present invention should, therefore, be determined only by the following claims.

We claim:

1. A display apparatus that receives color input information and provides a spectral output having predetermined primary color coordinates, a predetermined luminance, and a predetermined color balance ratio, comprising:
    a display device having a transfer function and providing the spectral output having intrinsic primary color coordinates;
    a color processor receiving the intrinsic primary color coordinates and the predetermined primary color coordinates and calculating a set of matrix coefficients relating the intrinsic and predetermined color coordinates;
    a color space converter receiving the matrix coefficients and the color input information and generating primary color-corrected input information;
    a gain controller that receives the primary color-corrected input information and provides gain-adjusted amounts of the primary color-corrected input information to establish the predetermined color balance ratio and the predetermined luminance; and
    a display device transfer function converter receiving the primary color-corrected input information and providing display device driving signals in amounts that compensate for the transfer function while maintaining in the spectral output the predetermined primary color coordinates and the predetermined color balance ratio.

2. The apparatus of claim 1 in which the transfer function is nonlinear and the gain controller and the display device transfer function converter are embodied in at least one lookup table.

3. The apparatus of claim 1 in which the predetermined luminance and the predetermined color balance ratio are independently adjustable without substantial interaction.

4. The apparatus of claim 1 in which the display device includes a liquid crystal light transmission device.

5. The apparatus of claim 1 in which the display apparatus comprises a projection display.

6. The apparatus of claim 1 in which the predetermined primary color coordinates include red, blue, and green primary color coordinates.

7. The apparatus of claim 1 in which the display device comprises a liquid crystal display and the display device transfer function converter includes a lookup table storing addressable values for compensating for an S-curve nonlinear transfer function of the liquid crystal display device.

8. In a multiscreen display system that receives color input information, a method of providing a spectral output having predetermined primary color coordinates, and a predetermined color balance ratio, comprising:
    providing an array of substantially similar display devices, each display device contributing to the spectral output and including: a transfer function, intrinsic primary color coordinates, and an intrinsic color gamut, the predetermined primary color coordinates being within the intrinsic color gamut of each of the display devices;
    storing the intrinsic primary color coordinates and the predetermined primary color coordinates;
    calculating a set of matrix coefficients relating the intrinsic and predetermined color coordinates;
    receiving the matrix coefficients and the color input information and generating primary color-corrected input information; and
    receiving the primary color-corrected input information and providing display device driving signals in amounts that compensate for the transfer function while maintaining in the spectral output the predetermined primary color coordinates and the predetermined color balance ratio.

9. The method of claim 8 in which the spectral output further has a predetermined luminance and the method further includes receiving the primary color-corrected input information and providing in each display device gain-adjusted amounts of the primary color-corrected input information to establish the predetermined color balance ratio and the predetermined luminance.

10. The method of claim 8 in which each display device includes a liquid crystal light transmission device.

11. The method of claim 8 in which the multiscreen display system comprises a projection display.

12. The method of claim 8 in which the predetermined primary color coordinates include red, blue, and green primary color coordinates.

13. The method of claim 8 in which the providing step includes measuring the spectral output to determine a set of intrinsic red ("R"), green ("G"), and blue ("B") brightness and color coordinates for each display device.

14. The method of claim 13 in which the storing and calculating steps include:
    entering the set of intrinsic coordinates into a matrix;
    defining a set of target R, G, B, and white color coordinates corresponding to the predetermined primary color coordinates;
    calculating a ratio of R, G, and B values that provide a predetermined white coordinate;
    calculate a set of X and Z components for the intrinsic and target R, G, and B color coordinates; and
    determining the primary color-corrected input information by solving a color space transformation matrix having three coefficients for each primary color.

15. A multiscreen display apparatus that receives color input information and provides a spectral output having predetermined primary color coordinates, and a predetermined color balance ratio, comprising:
    an array of substantially similar display devices, each display device contributing to the spectral output and including: a transfer function, intrinsic primary color coordinates, and an intrinsic color gamut, the predetermined primary color coordinates being within the intrinsic color gamut of each of the display devices;
    a color processor receiving the intrinsic primary color coordinates and the predetermined primary color coordinates and calculating a set of matrix coefficients relating the intrinsic and predetermined color coordinates;
    a color space converter receiving the matrix coefficients and the color input information and generating primary color-corrected input information; and
    a display device transfer function converter receiving the primary color-corrected input information and providing display device driving signals in amounts that compensate for the transfer function while maintaining in the spectral output the predetermined primary color coordinates and the predetermined color balance ratio.

* * * * *